United States Patent Office 2,702,822
Patented Feb. 22, 1955

2,702,822

PRODUCTION OF UNSATURATED AMIDES

Cyrus A. Weisgerber, Chadds Ford, Pa., assignor to Hercules Powder Company, Wilmington, Del., a corporation of Delaware No Drawing. Application June 12, 1952,
Serial No. 293,216

7 Claims. (Cl. 260—561)

This invention relates to a process for the preparation of amides of $\alpha,\beta$-unsaturated monocarboxylic acids.

A number of processes have been proposed for the preparation of $\alpha,\beta$-unsaturated monocarboxylic acids from a $\beta$-substituted saturated monocarboxylic acid. Thus, it is well known that $\beta$-halogenated monocarboxylic acid derivatives may be readily dehydrohalogenated to the corresponding $\alpha,\beta$-unsaturated monocarboxylic acid derivative by means of a treatment with an equivalent amount of strong alkali. The removal of a $\beta$-hydroxyl by dehydration of a $\beta$-hydroxy monocarboxylic acid derivative using acid or a surface-active catalyst such as silica or alumina is well known. Similarly, the dealcoholysis of a $\beta$-alkoxy-substituted carboxylic acid derivative by means of an acid or surface-active catalyst is also well known. Neither the dehydration nor the dealcoholysis reaction goes as smoothly as the dehydrohalogenation. Thus, the conversion is generally rather low and of the amount converted there will be appreciable amounts of undesirable by-products.

There has now been discovered a process for the dealcoholysis of a $\beta$-alkoxy-substituted monocarboxylic acid amide containing at least one hydrogen in the $\alpha$ position with conversions of up to 90% or more and virtually no by-product production. This is obtained by passing a $\beta$-alkoxy-substituted monocarboxylic acid amide having at least one hydrogen in the $\alpha$ position over a solid, inorganic alkaline catalyst at a temperature of from about 200° C. to about 300° C. and at a pressure of no more than about 100 mm. of mercury absolute.

The compounds which may be used as the feed stock for this process have the general formula

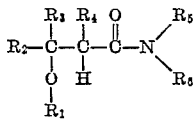

wherein $R_1$ is an alkyl group containing from 1 to about 10 carbon atoms, and $R_2$, $R_3$, $R_4$, $R_5$ and $R_6$ represent either hydrogen atoms; alkyl groups, such as methyl, ethyl, isobutyl, octyl, decyl, etc.; cycloalkyl groups, such as cyclohexyl; aryl groups, such as phenyl; or aralkyl groups, such as benzyl. In any case, $R_2$, $R_3$, $R_4$, $R_5$ and $R_6$ may be the same or different. It is preferred to use low molecular weight $\beta$-alkoxymonocarboxylic acid amides corresponding to the above formula wherein $R_2$ and $R_3$ are hydrogen atoms; $R_1$ is a lower alkyl radical containing from 1 to 10 carbon atoms; and $R_4$, $R_5$ and $R_6$ may be hydrogen or lower alkyl radicals selected so that the amide all together contains from 4 to 20 carbon atoms. Examples of such compounds are $\beta$-methoxypropionamide, $\beta$-ethoxypropionamide, $\beta$-isobutylpropionamide, $\beta$-decylpropionamide, $\beta$-methoxy-$\alpha$-methylpropionamide, $\beta$-methoxy-$\alpha$-ethylpropionamide, $\beta$-decyl-$\alpha$-amylpropionamide, N-methyl-$\beta$-methoxy-$\alpha$-methylpropionamide, N,N-dimethyl-$\beta$-methoxy-$\alpha$-methylpropionamide, etc. It is most preferred to use those compounds wherein $R_1$ is a lower alkyl radical containing from 1 to 10 carbon atoms. $R_2$, $R_3$, $R_5$ and $R_6$ are hydrogen, and $R_4$ may be either hydrogen, methyl or ethyl.

The following examples are presented in illustration but not in limitation of the invention. All parts are by weight unless otherwise specified.

*Example 1*

The apparatus consisted of a microfeeder pump manufactured by % Proportioneers %, Inc. This pump is a positive displacement piston pump having a capacity of 100 ml. of liquid and a variable feed rate of 1.65 to 25 ml. per hour in 0.05 ml. increments. This was connected to the top of a reactor tube by an electrically heated glass tube. The cylinder of the pump was also electrically heated. The 2.5 ft. x 30 mm. (outer diameter) jacketed reactor tube was heated by refluxing a eutectic mixture of diphenyl and diphenyl oxide (sold by The Dow Chemical Company under the trade name of Dowtherm A) through the jacket. The bottom of the reactor tube was connected to a mechanical vacuum pump through an acrylamide receiver held at room temperature and a methanol receiver cooled by Dry Ice and acetone.

Into the reaction tube was placed 100 ml. of 4-mesh-calcium oxide which had been heated overnight at 600°–610° C. This volume of catalyst weighed 71.9 g. The catalyst chamber was heated to 260° C. by means of the refluxing Dowtherm A. The pressure at the bottom of the reactor was reduced to 31 mm. mercury absolute. With this pressure at the exit of the reactor the pressure at the reactor inlet was 38.5 mm. mercury absolute. Into the top of the reactor tube was pumped $\beta$-methoxypropionamide at a rate of 7.0 ml. per hour for 88.7 minutes. Two and six-tenths minutes were required for the products to appear on the exit side of the reactor. In all, 11.2 g. of $\beta$-methoxypropionamide was pumped. There was obtained 7.3 g. of a solid product consisting of 69% acrylamide. The remainder of the product in the arylamide receiver consisted of unreacted $\beta$-methoxypropionamide. The methanol receiver contained 2.9 g. of methanol. The conversion of $\beta$-methoxypropionamide was 65.5% corresponding to a yield of 81.8% (the yield is defined as the percentage of the desired product obtained based on the amount of desired product theoretically obtainable from the reactant consumed, i. e., not recovered).

*Example 2*

The equipment described in Example 1 was used. Into the reactor tube was placed 250 ml. of 4-mesh calcium oxide weighing 214 g. which had been heated overnight at 600°–610°C. The temperature of the reactor tube was raised to 260° C. by refluxing a eutectic mixture of diphenyl and diphenyl oxide (marketed by The Dow Chemical Company under the trade name of Dowtherm A) in the jacket of the reactor. The pressure at the exit of the reactor was reduced to 1 mm. mercury and $\beta$-methoxypropionamide introduced into the top of the reactor at the rate of 25 ml. per hour for 90 minutes. All together, 40.1 g. of $\beta$-methoxypropionamide was pumped. There was obtained 24.2 g. of solid product consisting of 90.5% acrylamide. The remainder of the product in the acrylamide receiver consisted of unreacted $\beta$-methoxypropionamide. The methanol receiver contained 10.7 g. of product consisting of 19.3% acrylamide and the balance methanol. The conversion of $\beta$-methoxypropionamide to acrylamide was 88.8%. The remainder of the product consisted of unreacted $\beta$-methoxypropionamide.

*Example 3*

The equipment described in Example 1 was used. Into the reactor tube was placed 260 ml. of 4-mesh calcium oxide topped by 5 ml. of ¼ inch glass beads. The temperature of the reactor was raised to 258°–259° C. by refluxing a eutectic mixture of diphenyl and diphenyl oxide (marketed by The Dow Chemical Company under the trade name of Dowtherm A), and the pressure at the exit of the reactor tube was reduced to about 1 mm. mercury. Into the top of the reactor tube was pumped $\beta$-methoxypropionamide at the rate of 2.57 ml. per hour until 48.3 ml. of $\beta$-methoxypropionamide had been added. All in all, 51.6 g. of material was pumped. There was obtained 32.8 g. of a solid product consisting of 98% acrylamide. The methanol receiver contained 17.7 g. of methanol. The conversion to acrylamide was 90.5%. The remainder of the product in the acrylamide receiver consisted of unreacted $\beta$-methoxypropionamide.

Example 4

In this example the apparatus consisted of a 1 ft. x 30 mm. (outer diameter) vapor jacketed tube. The reactor tube was packed with ¼ inch glass beads and heated to about 215° C. with refluxing diethylene glycol. The pressure at the top of the tube was lowered to about 1 mm. mercury absolute by a mechanical pump which was connected to the tube through an acrylamide receiver held at room temperature and a methanol receiver cooled by Dry Ice and acetone. β-Methoxypropionamide was introduced dropwise into a vaporization chamber fitted to the bottom of the reaction zone. The vaporization chamber was heated to about 177° C. At this temperature 25.4 g. of β-methoxypropionamide was vaporized through the reactor in 49.6 minutes. Twenty-four and one-tenth grams of product was collected in the acrylamide receiver. The Dry Ice-acetone trap contained negligible condensate. Polarographic analysis of the product for acrylamide indicated that conversion of β-methoxypropionamide to acrylamide was about 1.08%. This indicates that pyrolysis alone produces very little acrylamide.

Example 5

The equipment described in Example 4 was used except that the reactor tube was 2½ feet long. The reactor tube was packed with 161.3 g. of 4-mesh lime which had been heated overnight at 600°–610° C. β-Methoxypropionamide was introduced dropwise into a vaporization chamber fitted to the bottom of the reactor tube. The pressure at the product receiver was reduced to about 1 mm. and the reactor heated to 230° C. by refluxing diethylene glycol in the heating jacket. The vaporization chamber at the bottom of the reactor was heated to 176°–177° C. At this temperature 31.1 g. of β-methoxypropionamide was vaporized through the reactor in 107.8 minutes. At the end of this time, the receiver contained 24.1 g. of product while the Dry Ice-acetone trap contained 5.6 g. of liquid. The weight of products recovered amounted to 95% of the weight of β-methoxypropionamide introduced into the reactor. The product contained 55.5% acrylamide corresponding to a 62.6% conversion of β-methoxypropionamide to acrylamide and a yield of 95%. The remainder of the product consisted of unreacted β-methoxypropionamide.

Example 6

The equipment described in Example 1 was used. Into the reactor tube was placed 153 g. of 4-mesh calcium oxide which had been heated overnight at 600°–610° C. The temperature of the reactor tube was raised to 260° C. by refluxing a eutectic mixture of diphenyl and diphenyl oxide (marketed by The Dow Chemical Company under the trade name of Dowtherm A) in the jacket of the reactor. The pressure at the exit of the reactor was reduced to 63–65 mm. of mercury absolute and β-methoxypropionamide introduced into the top of the reactor at the rate of 7.5 g. per hour for 60 minutes so that all together 7.5 g. of β-methoxypropionamide was pumped. There was obtained 1.26 g. of solid product consisting of 80% acrylamide. The remainder of the product in the acrylamide receiver consisted of unreacted β-methoxypropionamide. The conversion of β-methoxypropionamide to acrylamide was 17.9%.

Example 7

The equipment described in Example 1 was used. Into the reactor tube was placed 132 g. of 4-mesh calcium oxide which had been heated overnight at 600°–610° C. The temperature of the reactor tube was raised to 260° C. by refluxing a eutectic mixture of diphenyl and diphenyl oxide (marketed by The Dow Chemical Company under the trade name of Dowtherm A) in the jacket of the reactor. The pressure at the exit of the reactor was reduced to 37–39 mm. of mercury absolute and β-methoxypropionamide introduced into the top of the reactor at the rate of 7.6 g. per hour for 60 minutes so that all together 7.6 g. of β-methoxypropionamide was pumped. There was obtained 3.38 g. of solid product consisting of 86% acrylamide. The remainder of the product in the acrylamide receiver consisted of unreacted β-methoxypropionamide. The conversion of β-methoxypropionamide to acrylamide was 55.3%.

Example 8

The equipment described in Example 1 was used. Into the reactor tube was placed 159 g. of 4-mesh calcium oxide which had been heated overnight at 600°–610° C. The temperature of the reactor tube was raised to 260° C. by refluxing a eutectic mixture of diphenyl and diphenyl oxide (marketed by The Dow Chemical Company under the trade name of Dowtherm A) in the jacket of the reactor. The pressure at the exit of the reactor was reduced to 100 mm. of mercury absolute and β-methoxypropionamide introduced into the top of the reactor at the rate of 7.5 g. per hour for 60 minutes so that all together 7.5 g. of β-methoxypropionamide was pumped. There was obtained 0.44 g. of solid product consisting of 42% acrylamide. The remainder of the product in the acrylamide receiver consisted of unreacted β-methoxypropionamide. The conversion of β-methoxypropionamide to acrylamide was 3.6%.

Such amounts of unreacted feed stock as are obtained in the product of the reaction may be recycled over the catalyst. In this way exceedingly high conversions of the desired unsaturated compounds may be obtained.

By the term "solid, inorganic alkaline catalyst" as used throughout the claims and specification is meant an oxide, hydroxide, or carbonate of an alkali metal or of an alkaline earth metal or mixtures of these compounds with each other. Thus, there may be used the oxides of lithium, sodium, potassium, calcium, strontium and barium; the hydroxides of lithium, sodium, potassium, calcium, strontium and barium; and the carbonates of lithium, sodium, potassium, calcium, strontium and barium. These alkaline catalysts may be used as such or they may be supported on a suitable carrier such as silica gel, alumina gel, kieselguhr, pumice, vermiculite, pelleted clays, sintered glass, sintered clays, infusorial earth or the like. It is preferred to use lime or a supported lime catalyst.

In the instant process, the higher the pressure the lower the conversion. The maximum pressure that can be used to obtain practicable conversions will vary somewhat with the temperature and with the particular alkaline catalyst used. In general, the process should never be carried out at a pressure greater than about 100 mm. of mercury absolute. It is preferred to use a pressure of less than about 50 mm. of mercury absolute. In general, as low a pressure as possible should be used, 1 mm. of mercury absolute or less being most preferred. At pressures of 50 mm. of mercury absolute or less, conversions of about 50% or more may be obtained; while at pressures of 1 mm. of mercury absolute or less, conversions of about 90% or more may be obtained.

For the production of an unsaturated amide, the temperature may be anywhere from about 200° C. to about 300° C. with the range from 250° C. to 280° C. being preferred. It is to be understood that the preferred temperatures herein set forth relate only to the preparation of acrylamide and methacrylamide from the corresponding saturated β-methoxymonocarboxylic acid amides using a lime catalyst. Different preferred temperatures will obtain for different combinations of feed stock and catalyst. In any case the temperature will fall within the broad ranges specified herein.

By means of the process of this invention it is possible to obtain unsaturated amides at conversions of over 90% and with virtually no by-product formation by using the cheap and readily available alkaline catalysts.

What I claim and desire to protect by Letters Patent is:

1. A process of dealcoholizing a compound of the formula

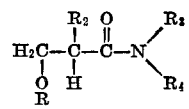

wherein $R_1$ is selected from the group consisting of lower alkyl radicals containing from 1 to 10 carbon atoms and $R_2$, $R_3$ and $R_4$ are selected from the group consisting of hydrogen and lower alkyl radicals so that the amide contains from 4 to 20 carbon atoms, which comprises passing the said compound in the vapor phase over a solid inorganic alkaline catalyst selected from the group consisting of the oxides, hydroxides, and carbonates of the alkali metals and alkaline earth metals, and mixtures of the said compounds with each other at a temperature between about 200° C. and about 300° C. and at a pressure of less than about 100 mm. mercury absolute.

2. A process of dealcoholizing β-methoxypropionamide which comprises passing the said β-methoxypropionamide in the vapor phase over a solid inorganic alkaline catalyst selected from the group consisting of the oxides, hydroxides, and carbonates of the alkali metals and alkaline earth metals, and mixtures of the said compounds with each other at a temperature between about 200° C. and about 300° C. at a pressure less than about 100 mm. mercury absolute.

3. A process of dealcoholizing β-methoxypropionamide which comprises passing the said β-methoxypropionamide in the vapor phase over a calcium oxide catalyst at a temperature between about 200° C. and about 300° C. at pressure less than about 100 mm. mercury absolute.

4. A process of dealcoholizing β-methoxypropionamide which comprises passing the said β-methoxypropionamide in the vapor phase over a calcium oxide catalyst at a temperature between about 250° C. to 280° C. at a pressure less than about 50 mm. mercury absolute.

5. A process of dealcoholizing a compound of the general formula

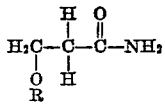

where R is a lower alkyl radical containing from 1 to 10 carbon atoms which comprises passing the said compound in the vapor phase over a solid inorganic alkaline catalyst from the group consisting of the oxides, hydroxides and carbonates of the alkali metals and alkaline earth metals and mixtures of the said compounds with each other, at a temperature between about 200° C. and about 300° C. and at a pressure of less than about 100 mm. mercury absolute.

6. A process of dealcoholizing a compound of the general formula

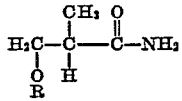

where R is a lower alkyl radical containing from 1 to 10 carbon atoms which comprises passing the said compound in the vapor phase over a solid inorganic alkaline catalyst selected from the group consisting of oxides, hydroxides and carbonates of the alkali metals and alkaline earth metals and mixtures of the said compounds with each other, at a temperature between about 200° C. and about 300° C. and at a pressure of less than about 100 mm. mercury absolute.

7. A process of dealcoholizing a compound of the general formula

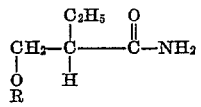

wherein R is a lower alkyl radical containing from 1 to 10 carbon atoms which comprises passing the said compound in the vapor phase over a solid inorganic alkaline catalyst selected from the group consisting of the oxides, hydroxides and carbonates of the alkali metals and alkaline earth metals and mixtures of the said compounds with each other, at a temperature between about 200° C. and about 300° C. and at a pressure of less than about 100 mm. mercury absolute.

References Cited in the file of this patent

UNITED STATES PATENTS

| Number | Name | Date |
|---|---|---|
| 2,375,005 | Kung | May 1, 1945 |
| 2,393,000 | Seeger | Jan. 15, 1946 |
| 2,534,585 | Erickson | Dec. 19, 1950 |
| 2,562,583 | Schulz et al. | July 31, 1951 |
| 2,587,209 | Phillips et al. | Feb. 26, 1952 |
| 2,587,210 | Phillips et al. | Feb. 26, 1952 |